(12) United States Patent
Shim et al.

(10) Patent No.: US 7,474,028 B2
(45) Date of Patent: Jan. 6, 2009

(54) MOTOR

(75) Inventors: Jang Ho Shim, Seoul (KR); Jin Soo Park, Inchun-si (KR); Sung Ho Lee, Anyang-si (KR); Byung Taek Kim, Ansan-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/299,686

(22) Filed: Dec. 13, 2005

(65) Prior Publication Data

US 2006/0220485 A1    Oct. 5, 2006

(30) Foreign Application Priority Data

Apr. 4, 2005   (KR) ...................... 10-2005-0028161

(51) Int. Cl.
*H02K 21/12*   (2006.01)
*H02K 1/27*    (2006.01)

(52) U.S. Cl. ................................ 310/156.53

(58) Field of Classification Search ................. 310/254, 310/156.53, 54
See application file for complete search history.

(56) References Cited

U.S. PATENT DOCUMENTS

| | | | | |
|---|---|---|---|---|
| 2,054,479 A * | 9/1936 | Hoddy | ......................... | 477/12 |
| 2,062,322 A * | 12/1936 | Lilja | ......................... | 310/172 |
| 3,411,027 A * | 11/1968 | Rosenberg | ................... | 310/181 |
| 4,081,703 A * | 3/1978 | Madsen et al. | ............ | 310/49 R |
| 4,674,178 A * | 6/1987 | Patel | ......................... | 29/598 |
| 4,859,162 A * | 8/1989 | Cox | ......................... | 418/152 |
| 4,910,861 A * | 3/1990 | Dohogne | ..................... | 29/598 |
| 5,157,297 A * | 10/1992 | Uchida | ................... | 310/156.61 |
| 5,191,256 A * | 3/1993 | Reiter et al. | .......... | 310/156.49 |
| 5,386,161 A * | 1/1995 | Sakamoto | ................ | 310/49 R |
| 5,465,019 A * | 11/1995 | Kliman | ................... | 310/156.04 |
| 5,773,908 A * | 6/1998 | Stephens et al. | ........... | 310/254 |
| 5,877,574 A * | 3/1999 | Molnar | ..................... | 310/215 |
| 5,912,516 A * | 6/1999 | Atkinson et al. | ......... | 310/67 R |
| 5,932,943 A * | 8/1999 | Werner et al. | ............ | 310/67 A |
| 6,069,422 A * | 5/2000 | Garrison et al. | ............. | 310/51 |
| 6,072,252 A * | 6/2000 | Van Dine et al. | ............ | 310/43 |
| RE37,576 E * | 3/2002 | Stephens et al. | .......... | 310/254 |
| 6,437,473 B1 * | 8/2002 | Mobius et al. | ......... | 310/156.21 |
| 6,897,588 B2 * | 5/2005 | Okubo | .................. | 310/156.36 |
| 6,919,663 B2 * | 7/2005 | Iles-Klumpner | ....... | 310/156.53 |
| 2004/0070891 A1 * | 4/2004 | Wang et al. | ................... | 361/23 |
| 2006/0066159 A1 * | 3/2006 | Enomoto et al. | ............. | 310/54 |

FOREIGN PATENT DOCUMENTS

| CN | 1052976 A | 7/1991 |
|---|---|---|
| EP | 0 680 131 A2 | 11/1995 |

(Continued)

*Primary Examiner*—Karl Tamai
*Assistant Examiner*—Hanh Nguyen
(74) *Attorney, Agent, or Firm*—Birch, Stewart, Kolasch & Birch, LLP

(57) ABSTRACT

A motor includes a stator and a rotor rotated due to the interaction between the rotor and the stator. Since overhangs are protruded only from the circumference of a rotor core of the rotor facing the stator in the axial direction, manufacturing costs for improving performance and core loss of the stator are minimized. Additionally, since the rotor core is manufactured by iron powder metallurgy, the rotor core is conveniently designed.

24 Claims, 5 Drawing Sheets

FOREIGN PATENT DOCUMENTS

| | | |
|---|---|---|
| EP | 1 354 653 A1 | 10/2003 |
| JP | 2000-116044 A | 4/2000 |
| JP | 2002-101583 A | 4/2002 |
| JP | 2003-074472 A | 3/2003 |
| JP | 2004140950 A * | 5/2004 |
| WO | WO 2004/051824 A1 | 6/2004 |

* cited by examiner

MOTOR

BACKGROUND OF THE INVENTION

1. Field of the Invention

The present invention relates to a motor, and more particularly, to a motor in which an overhang is protruded from the circumference of a rotor core facing a stator in the axial direction.

2. Description of the Related Art

FIG. 1 is a perspective view illustrating a conventional motor, FIG. 2 is a plan view of the conventional motor, and FIG. 3 is a sectional view taken along the line A-A in FIG. 1.

The conventional motor shown in FIG. 1 to 3 is an inner rotor motor in which a rotor 20 is rotatably installed in a stator 10 by a predetermined gap G and rotated due to the electromagnetic interaction between the rotor 20 and the stator 10.

The stator 10 includes a ring-shaped yoke 12, a plurality of teeth 14 radially arranged on the inner wall of the yoke 12, and coils 16 wound around the teeth 14 and electrically connected to an external electric power source.

Here, the combination of the yoke 12 and a plurality of teeth 14 is referred to as a stator core. The stator core is manufactured by laminating a plurality of electric steel sheets having the same plane as that of the stator core.

The rotor 20 includes a rotor core 22 disposed in the stator 10 to rotate while keeping the predetermined gap G and a plurality of magnets 24 attached to the rotor core 22 in the radial configuration.

The rotor core 22 is formed by laminating a plurality of electric steel sheets having the same plane as that of the rotor core 22.

Particularly, in the above-mentioned rotor 20, when the area of the rotor 20 facing the stator 10 is large, the quantity of effective magnetic flux orthogonal to the stator 10 is increased so that the performance of a motor is improved. Thus, the rotor 20 is longer than the stator 10 in the axial direction, and this is called "Overhang Effect".

In order to achieve the overhang effect in the conventional motor, only the outer circumference of the rotor core 22 is longer than the stator 10 in the axial direction. However, since the electric steel sheets have a two-dimensional structure, overall rotor 20 is longer than the stator 10 in the axial direction, and manufacturing costs for the improvement of the motor are increased.

Moreover, in order to achieve the overhang effect in the conventional motor, since the rotor 20 is longer than the stator 10 in the axial direction, entire volume of the conventional motor is increased, or in the event of restricting the entire size of the conventional motor, the stator 10 becomes relatively smaller. As a result, there arises a counter effect that core loss of the stator 10 is increased.

SUMMARY OF THE INVENTION

Therefore, the present invention has been made in view of the above and/or other problems, and it is an object of the present invention to provide a motor in which an overhang is protruded from only the circumference of a rotor core facing a stator in the axial direction so that overhang effect can be achieved.

In accordance with the present invention, the above and other objects can be accomplished by the provision of a motor including a rotor including a rotor core arranged to confront a stator, and a plurality of magnets attached to the rotor core, wherein the rotor core includes overhangs protruded from the circumference confronting the stator in the axial direction.

Preferably, the stator includes a ring-shaped yoke, and a plurality of teeth, arranged to the circumference of the yoke, around which coils are wound, wherein the axial length of the yoke is equal to the sum of the axial length of the rotor core and the axial length of the overhangs of the rotor core.

Preferably, the stator includes a ring-shaped yoke, and a plurality of teeth, arranged to the circumference of the yoke in the radial configuration, around which coils are wound, wherein the axial length of necks, around which coils are wound, is shorter than the sum of the axial length of the rotor core and the axial length of the overhangs of the rotor core.

Each of the teeth is positioned at the end of each of the necks such that the axial length of tips confronting the rotor is longer than the axial length of the necks of the teeth.

The axial length of each of the tips of the teeth is equal to the sum of the axial length of the rotor core and the axial length of the overhangs of the rotor core.

Preferably, the stator includes a ring-shaped yoke, and a plurality of teeth, arranged to the circumference of the yoke, around which coils are wound, wherein the yoke and the plural teeth are manufactured by iron powder metallurgy.

The overhangs of the rotor core are disposed to the axial sides of the rotor core.

Preferably, the overhangs of the rotor core are disposed between the magnets and the stator in the radial direction of the rotor.

When at least a part of the respective overhangs of the rotor core goes away from the stator in the radial direction of the rotor, the axial length of the overhangs is shorter.

The magnets have an arc-shape convex toward the opposite side of the stator in the radial direction of the rotor, and are arranged to the circumference of the rotor core facing the stator in the radial configuration, and the overhangs of the rotor core are disposed between the ends of the magnets.

The overhangs of the rotor core are arranged in the radial configuration and each of the overhangs of the rotor core is positioned between the ends of each of the magnets.

Preferably, the rotor core is manufactured by iron powder metallurgy.

The motor of the present invention is an inner rotor motor in which the rotor is rotatably installed in the stator.

The object of the present invention can also be achieved by the provision of a motor including a stator; and a rotor including a rotor core, rotatably installed in the stator, in which a plurality of overhangs protruded from the outer circumference of the rotor core in the axial direction in the radial configuration, and a plurality of magnets attached to the rotor core in the radial configuration; wherein each of the overhangs of the rotor core is positioned between the stator and each of the magnets in the radial direction of the rotor.

Preferably, when at least a part of the respective overhangs of the rotor core goes away from the stator in the radial direction of the rotor, the axial length of the overhangs is shorter.

Preferably, the overhangs of the rotor core are disposed to the axial sides of the rotor core.

The stator includes a ring-shaped yoke; necks, arranged to the circumference of the yoke, around which coils are wound; and a plurality of teeth having a plurality of tips disposed to the ends of the necks and confronting the rotor; wherein the yoke and the plural teeth are manufactured by iron powder metallurgy, the axial lengths of the yoke and each of the teeth are equal to the sum of the axial length of the rotor core and the axial length of the overhangs of the rotor core, and the axial length of each of the necks of the teeth is shorter than the sum of the axial length of the rotor core and the axial length of the overhangs of the rotor core.

The object of the present invention can also be accomplished by the provision of a motor including a stator; and a rotor rotatably installed in the stator and rotated due to the electromagnetic interaction between the rotor and the stator, the rotor including a rotor core, rotatably installed in the stator, in which a plurality of overhangs protruded from the outer circumference of the rotor core in the axial direction in the radial configuration, and a plurality of magnets attached to the rotor core in the radial configuration; wherein each of the overhangs of the rotor core is positioned between the stator and each of the magnets in the radial direction of the rotor, and the axial length of the overhangs is shorter when at least a part of the respective overhangs of the rotor core goes away from the stator in the radial direction of the rotor, and each of the magnets has an arc-shape convex toward the center of the rotor core and surrounds each of the overhangs of the rotor core.

Preferably, the stator includes a ring-shaped yoke; necks, arranged to the circumference of the yoke, around which coils are wound; and a plurality of teeth having a plurality of tips disposed to the ends of the necks and facing the rotor; wherein, the yoke and the plural teeth are manufactured by iron powder metallurgy, the axial lengths of the yoke and each of the teeth are equal to the sum of the axial length of the rotor core and the axial length of the overhangs of the rotor core, and the axial length of each of the necks of the teeth is shorter than the sum of the axial length of the rotor core and the axial length of the overhangs of the rotor core.

BRIEF DESCRIPTION OF THE DRAWINGS

These and/or other objects and advantages of the present invention will become apparent and more readily appreciated from the following description of the embodiments, taken in conjunction with the accompanying drawings, in which.

DESCRIPTION OF THE PREFERRED EMBODIMENTS

Hereinafter, embodiments of a motor according to the present invention will be described with reference to the accompanying drawings.

Several embodiments of the present invention may be described. Since the basic structure of the motor of the present invention is identical to that of a conventional motor, a detailed description thereof will be omitted.

Figure 1:
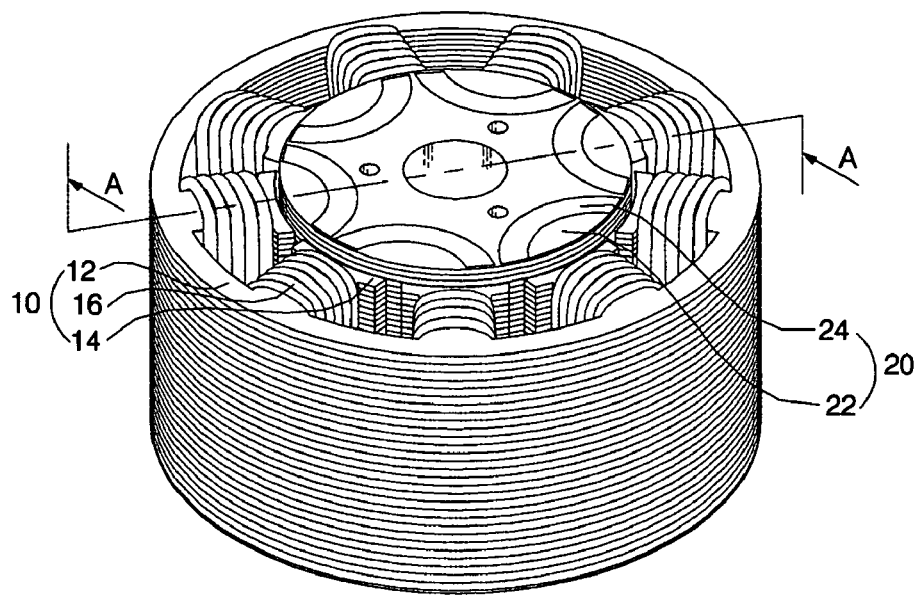
FIG. 1 is a perspective view illustrating a conventional motor.
Figure 2:
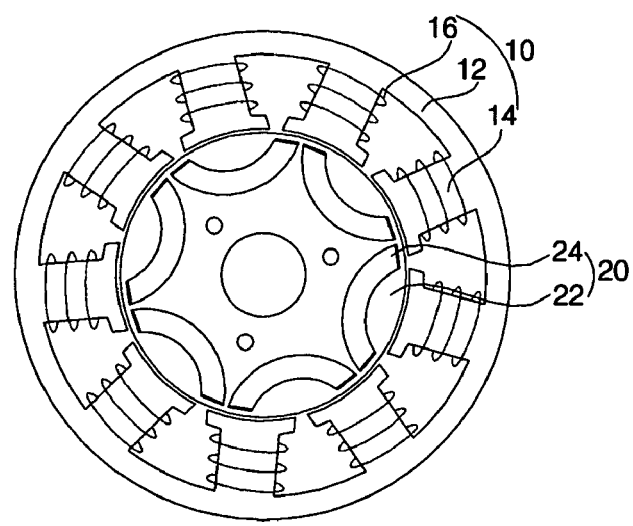
FIG. 2 is a plan view of the conventional motor.
Figure 3:
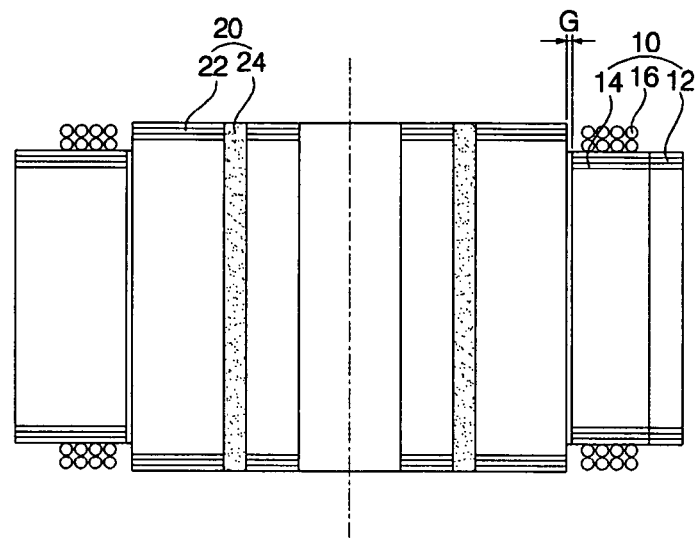
FIG. 3 is a sectional view taken along the line A-A in FIG. 1.
Figure 4:
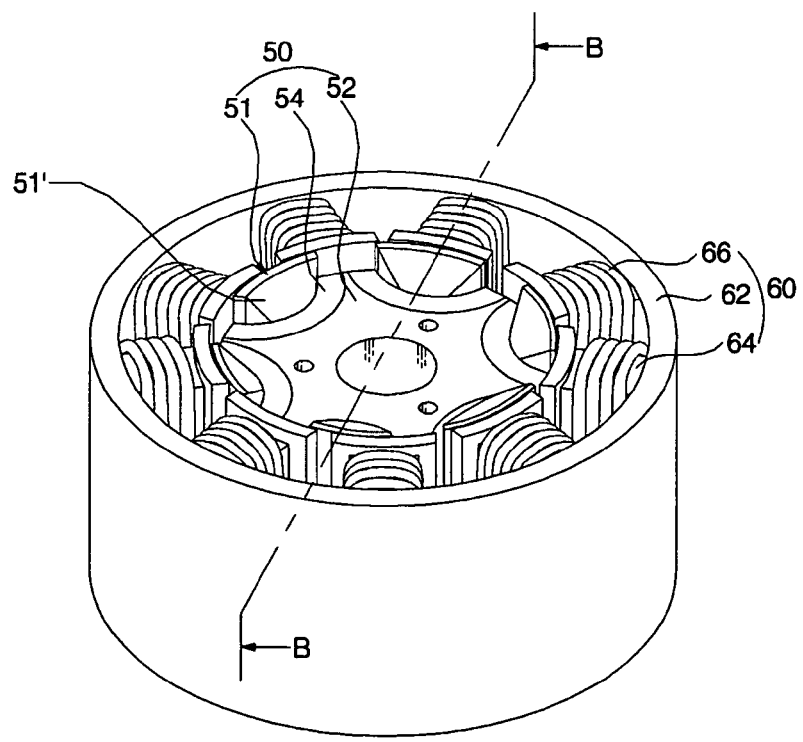
FIG. 4 is a perspective view illustrating a motor according to a first preferred embodiment of the present invention.
Figure 5:
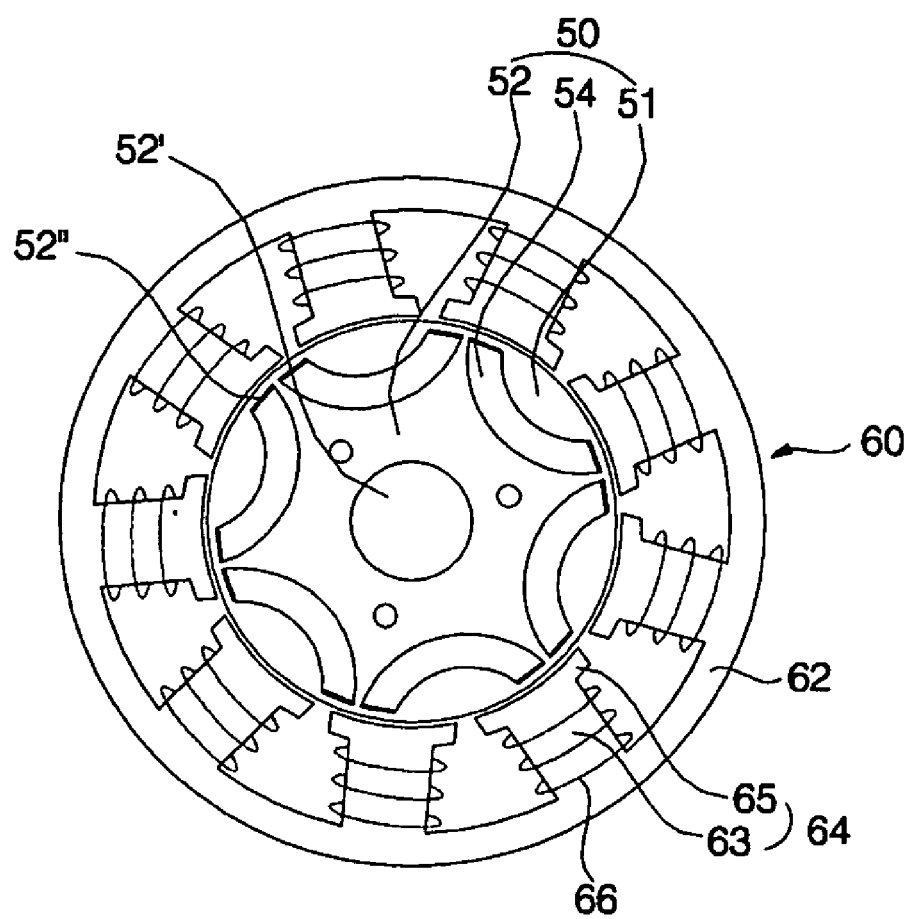
FIG. 5 is a plan view illustrating the motor according to the first preferred embodiment of the present invention.
Figure 6:
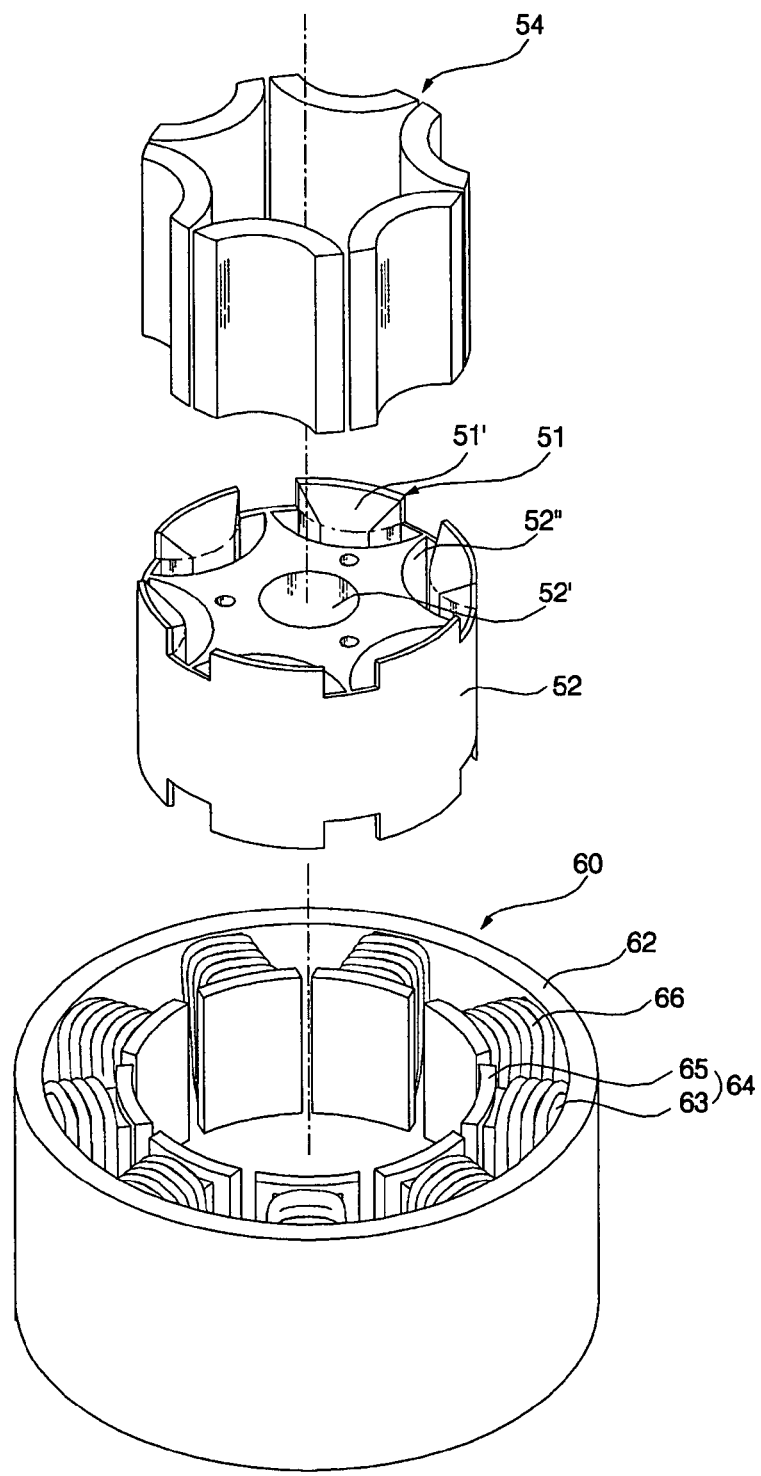
FIG. 6 is an exploded perspective view illustrating the motor according to the first preferred embodiment of the present invention.
Figure 7:
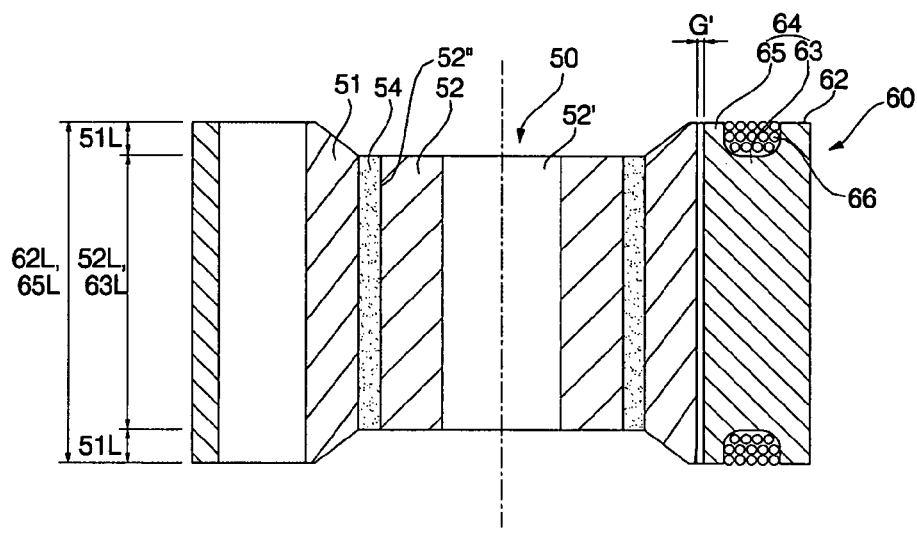
FIG. 7 is a sectional view taken along the line B-B in FIG. 4.

FIG. 4 is a perspective view illustrating a motor according to a first preferred embodiment of the present invention, FIG. 5 is a plan view illustrating the motor according to the first preferred embodiment of the present invention, FIG. 6 is an exploded perspective view illustrating the motor according to the first preferred embodiment of the present invention, and FIG. 7 is a sectional view taken along the line B-B in FIG. 4.

As shown in FIGS. 4 to 7, a motor according to the first preferred embodiment of the present invention is an inner rotor motor in which a rotor 50 is installed in a stator 60 to rotate while keeping a predetermined air gap G'.

The rotor 50 includes a rotor core 52 rotatably installed in the stator 60 to keep the predetermined air gap G' and a plurality of magnets 54 attached to the rotor core 52 in a radial configuration.

The rotor core 52 may have a shaft hole 52' formed at the center thereof, into which a rotation shaft is integrally fitted. The rotor core 52 also has magnet holes 52" into which respective magnets 54 are inserted into the outer circumference thereof confronting the stator 60 in the axial direction.

Particularly, the rotor core 52 has overhangs 51 protruding from the circumference facing the stator 60, that is, from the outer circumference of the rotor core 52 in the axial direction.

The overhangs 51 of the rotor core 52 may be formed at the axial ends of the rotor core 52 such that the rotor 50 is symmetrical with respect to the axial direction.

The overhangs 51 of the rotor core 52 are positioned between the magnets 54 and the stator 60 in the radial direction so that the overhangs 51 face the stator 60.

Preferably, a plurality of overhangs 51 of the rotor core 52 may be arranged in a radial configuration.

In each of the overhangs 51 of the rotor core 52, the farther at least a part 51' of the overhang 51 is from the stator 60 in the radial direction of the rotor 50, the shorter the axial direction 51L of the part 51' of the overhang 51 may be.

The axial lengths 54L of the magnets 54 may be equal to the axial length 52L of the rotor core 52.

Each of the magnets 54 may have an arc shape convex toward the opposite side of the stator 60 in the radial direction of the rotor 50, i.e. toward the center of the rotor 50.

Meanwhile, the same number of the plural magnets 54 as the number of the overhangs 51 of the rotor core 52 may be arranged. Moreover, each of the plural magnets 54 may be arranged such that each of the plural overhangs 51 of the rotor core 52 is positioned between the end sides of each of the plural magnets 54. In other words, each of the plural magnets 54 encloses each of the plural overhangs 51 of the rotor core 52.

The rotor core 52 having the overhangs 51 may be manufactured by iron powder metallurgy so that the configuration of the rotor core 52 is conveniently designed.

The stator 60 includes a ring-shaped yoke 62 disposed to the outside of the rotor 50 while keeping a predetermined air gap 50', and a plurality of teeth 64 disposed to the inner wall of the yoke 62 in the radial configuration, around which coils 66 are wound.

The axial length of the yoke 62 may be equal to the sum of the axial length 52L of the rotor core 52 and the axial length 51L of the overhangs 51 of the rotor core 52. Here, the axial length 51L of the overhangs 51 of the rotor core 52 means the longest length among the axial lengths of the overhangs 51 of the rotor core 52.

Each of the teeth 64 includes a neck 63, protruded from the yoke 62 in the radial direction of the stator 60 toward the rotor 50, around which each of the coils 66 is wound, and a tip 65 disposed to an end of the neck 63 facing the rotor 50 to confront the rotor 50.

The axial length 63L of the necks 63 of the teeth 64 may be shorter than the sum of the axial length 52L of the rotor core 52 and the axial length 51L of the overhangs 51 of the rotor core 52.

The axial length 65L of the tips 65 of the teeth 64 may be longer than the axial length 63L of the necks 63 of the teeth 64. Particularly, the axial length 65L of the tips 65 of the teeth 64 may be equal to the sum of the axial length 52L of the rotor core 52 and the axial length 51L of the overhangs 51 of the rotor core 52.

The above-mentioned yoke 62 and teeth 64 may be manufactured by iron powder metallurgy, like the case of the rotor core 52 so that the yoke 62 and the teeth 64 are conveniently designed.

Operations and effects of the motor according to the first preferred embodiment of the present invention are as follows.

When electric power is applied to the coils 66, the rotor 50 is rotated due to the electromagnetic interaction between the rotor 50 and the stator 60.

Due to the structure of the rotor core 52 in which the overhangs 51 are disposed only to the outer circumference of the rotor core 52, and due to the fact that, when at least a part 51' of the respective overhangs 51 of the rotor core 52 is farther from the stator in the radial direction of the rotor 50, the axial length of the overhangs 51 is shorter, the overhang effect occurs in the motor according to the first preferred embodiment of the present invention.

Since the plural overhangs 51 of the rotor core 52 are arranged in the radial configuration, the rotor 50 is more smoothly rotated due to the magnetic reluctance difference.

This is the reason why the magnetic flux orthogonal in the direction from the rotor 50 to the stator 60 is relatively dense at regions of the rotor core 52 where the overhangs 51 of the rotor core 52 are disposed in the circumferential direction of the rotor core 52 and relatively sparse at regions of the rotor core 52 where the overhangs 51 of the rotor core 52 are not disposed. Thus, since the overhangs 51 of the rotor 50 perform like the teeth 64 of the stator 60, the magnetic reluctance difference of the rotor 50 is increased.

Moreover, since the magnets 54 are arranged to surround the overhangs 51 of the rotor core 52 such that the magnets 54 are positioned as close as possible to the stator 60 without any disturbance of the overhangs 51 of the rotor core 52, the leakage of the magnetic flux, orthogonal in the direction from the rotor 60 to the stator 50, from the rotor core 52 is minimized.

Additionally, the axial length 62L of the yoke 62 of the stator 60 is equal to the sum of the axial length 52L of the rotor core 52 and the axial length 51L of the overhangs 51 of the rotor core 52, core loss is minimized. In other words, if the size of the motor according to the first preferred embodiment of the present invention is fixed, the size of the yoke 62 of the stator 60 is maximized.

Since the axial length 63L of the necks 63 of the teeth 64 of the stator 60 is shorter than the sum of the axial length 52L of the rotor core 52 and the axial length 51L of the overhangs 51 of the rotor core 52, the magnetic flux is concentrated to the necks 63 of the teeth 64. Additionally, for the same reason, windings of the coils 66 are minimized, thereby reducing copper loss.

Moreover, since the axial length 65L of the tips 65 of the teeth 64 is equal to the sum of the axial length 52L of the rotor core 52 and the axial length 51L of the overhangs 51 of the rotor core 52, the overhang effect is maximized in the motor according to the first preferred embodiment of the present invention.

Therefore, as described above, the motor according to the first preferred embodiment of the present invention has an economical structure in which the performance of the motor can be maximized due to the overhang effect and reduction of loss under the condition of a fixed motor size.

Figure 8:
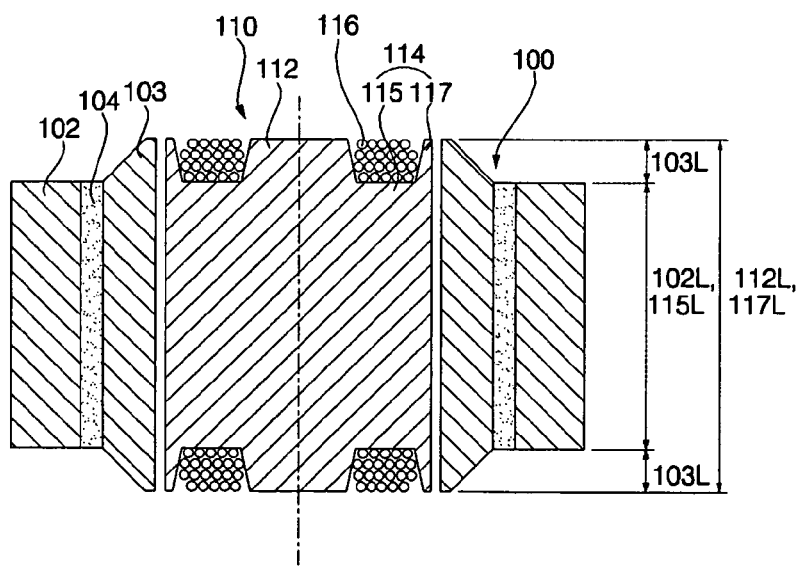
FIG. 8 is a side sectional view illustrating a motor according to a second preferred embodiment of the present invention.

FIG. 8 is a side sectional view illustrating a motor according to a second preferred embodiment of the present invention. Since the basic structure and aspects of a motor according to the second preferred embodiment of the present invention are identical to those of the motor according to the first preferred embodiment of the present invention, a detailed description and drawings thereof will be omitted.

As shown in FIG. 8, the motor according to the second preferred embodiment of the present invention is an outer rotor motor in which a rotor 100 is rotatably installed at the outside of a stator 110.

The rotor 100 includes a ring-shaped rotor core 102 rotatably installed at the outside of the stator 110 to keep a predetermined air gap 100' and a plurality of magnets 104 attached to the rotor core 102 in the radial configuration.

Particularly, on the inner circumference of the rotor core 102, a plurality of overhangs 103 is protruded from the rotor core 102 in the axial direction, and is arranged in the radial configuration.

Each of the overhangs 103 has a portion in which the axial length is gradually shorter from the inner circumference of the rotor core 102 to the outer circumference of the rotor core 102.

Each of the magnets 104 is formed in an arc-shape convex toward the outer circumference of the rotor core 102 and surrounds each of the overhangs 103.

The stator 110 includes a cylindrical yoke 112 and a plurality of teeth 116, arranged to the outer wall of the yoke 112, around which coils 114 are wound.

The axial length 112L of the yoke 112 is equal to the sum of the axial length 102L of the rotor core 102 and the axial length 103L of the overhangs 103.

Each of the teeth 116 includes a neck 115, connected to the yoke 112, around which each of the coils 114 is wound, and a tip 117 disposed at an end of the neck 115 facing the rotor 100 and confronting the rotor 100.

The axial length 115L of each of the necks 114 of the teeth 116 is shorter than the sum of the axial length 102L of the rotor core 102 and the axial length 103L of the overhangs 103 of the rotor core 102.

The axial length 117L of each of the tips 117 of the teeth 116 is equal to the sum of the axial length 102L of the rotor core 102 and the axial length 103L of the overhangs 103 of the rotor core 102.

Particularly, in the above-mentioned rotor core 102, the yoke 112, and the teeth 116 are manufactured by iron powder metallurgy such that the rotor core 102, the yoke 112, and the three-dimensional teeth 116 are conveniently designed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A motor comprising:
 a stator, the stator including a stator yoke; and
 a rotor including:
  a main portion having a plurality of magnet holes;
  a plurality of magnets inserted into the magnet holes of the main portion; and
  a plurality of overhangs located radially outwardly of the main portion and facing a circumferential surface of the stator, the overhangs extending above a top surface of the main portion for a first height, the stator yoke extending above the top surface of the main portion for a second height substantially equal to the first height, wherein a height of the overhangs closer to the stator is larger than a height of the overhangs farther from the stator.

2. The motor as set forth in claim 1, wherein the stator further comprises:

a plurality of teeth, arranged to the circumference of the stator yoke, around which coils are wound;

wherein an axial length of the stator yoke is substantially equal to a height of the overhangs.

3. The motor as set forth in claim 1, wherein the stator comprises:

a plurality of teeth, arranged to the circumference of the stator yoke, around which coils are wound;

wherein an axial length of necks, around which coils are wound, is shorter than a height of the overhangs.

4. The motor as set forth in claim 3, wherein each of the teeth is positioned at the end of each of the necks such that an axial length of tips facing the rotor is longer than the axial length of the necks of the teeth.

5. The motor as set forth in claim 3, wherein the axial length of each of the tips of the teeth is substantially equal to the height of the overhangs.

6. The motor as set forth in claim 1, wherein the stator comprises:

a plurality of teeth, arranged to the circumference of the stator yoke, around which coils are wound;

wherein the stator yoke is a ring-shaped yoke, and the stator yoke and the plurality of teeth are made of iron powder.

7. The motor as set forth in claim 1, wherein the overhangs are disposed at the circumferential surface of the rotor.

8. The motor as set forth in claim 1, wherein the overhangs are disposed between the magnets and the stator in a radial direction of the rotor.

9. The motor as set forth in claim 1, wherein a height of each of the overhangs gradually decreases along a radial direction of the rotor away from the stator.

10. The motor as set forth in claim 1, wherein each of the magnets has an arc-shaped convex facing away from the stator in a radial direction of the rotor, and wherein the overhangs are disposed between the magnets and the stator.

11. The motor as set forth in claim 10, wherein the overhangs are spaced apart from each other by the magnets.

12. The motor as set forth in claim 1, wherein the main portion of the rotor is made of iron powder.

13. The motor as set forth in claim 1, wherein the rotor is rotatably installed in the stator.

14. The motor as set forth in claim 1, wherein the overhangs extend in an axial direction of the rotor and along an outer circumferential surface of the magnets, the outer circumferential surface of the magnets facing the circumferential surface of the stator.

15. The motor as set forth in claim 1, wherein the number of the overhangs is equal to the number of the magnets.

16. The motor as set forth in claim 1, wherein the overhangs face a radially outer surface of the magnets, and the main portion faces a radially inner side of the magnets, the radially outer surface of the magnets is opposite to the radially inner surface of the magnets.

17. A motor comprising:
a stator, the stator including a stator yoke; and
a rotor including:
a main portion having a plurality of magnet holes;
a plurality of magnets inserted into the magnet holes of the main portion; and
a plurality of overhangs extending above a top surface of the main portion for a first height, the stator yoke extending above the top surface of the main portion for a second height substantially equal to the first height, wherein each of the overhangs is positioned between a circumferential surface of the stator and a corresponding one of the magnets in a radial direction of the rotor,
wherein a height of the overhangs closer to the stator is larger than a height of the overhangs farther from the stator.

18. The motor as set forth in claim 17, wherein the overhangs are disposed at the circumferential surface of the rotor.

19. The motor as set forth in claim 17, wherein the stator comprises:

necks, arranged to the circumference of the stator yoke, around which coils are wound; and a plurality of teeth having a plurality of tips disposed to the ends of the necks and facing the rotor;

wherein the stator yoke and the plurality of teeth are made of iron powder, wherein an axial length of the stator yoke and an axial length of each of the teeth are substantially equal to a height of the overhangs, and wherein an axial length of each of the necks of the teeth is shorter than the height of the overhangs.

20. The motor as set forth in claim 17, wherein the overhangs extend in an axial direction of the rotor and along an outer circumferential surface of the magnets, the outer circumferential surface of the magnets facing the circumferential surface of the stator.

21. The motor as set forth in claim 17, wherein the number of the overhangs is equal to the number of the magnets.

22. The motor as set forth in claim 17, wherein the overhangs face a radially outer surface of the magnets, and the main portion faces a radially inner side of the magnets, the radially outer surface of the magnets is opposite to the radially inner surface of the magnets.

23. A motor comprising:
a stator; and
a rotor including:
a main portion having a plurality of magnet holes;
a plurality of magnets inserted into the magnet holes of the main portion; and
a plurality of overhangs extending above a top surface of the main portion, wherein the overhangs are positioned at a circumferential surface of the rotor and wherein each of the magnets has an arc-shaped convex toward the main portion and surrounds a corresponding one of the overhangs.

24. The motor as set forth in claim 23, wherein the overhangs face a radially outer surface of the magnets, and the main portion faces a radially inner side of the magnets, the radially outer surface of the magnets is opposite to the radially inner surface of the magnets.

* * * * *